Figure 1:
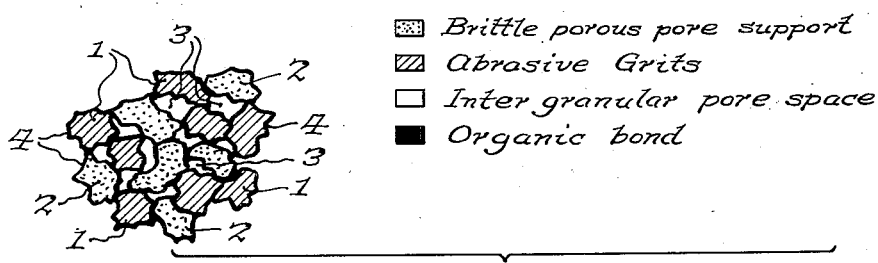

United States Patent Office 2,806,772
Patented Sept. 17, 1957

2,806,772
ABRASIVE BODIES

Norman P. Robie, Hamburg, N. Y., assignor to Electro Refractories & Abrasives Corporation, Buffalo, N. Y.

Application September 15, 1954, Serial No. 456,202

4 Claims. (Cl. 51—296)

This invention relates to bonded abrasive articles such as grinding wheels, discs, segments, rubs, etc. and more particularly to articles which have low temperature bonds such as phenol formaldehyde or other synthetic resins, shellac, rubber and the like which would be destroyed by heating to temperatures at which carbonaceous materials could be burned out to leave open pores. It constitutes a continuation-in-part of my application Serial No. 247,651, filed September 21, 1951, now Patent 2,734,812.

One object of this invention is to provide faster and cooler cutting grinding wheels. Another object of this invention is to provide a method of making a uniform abrasive article of greater than usual porosity. Another object of this invention is to promote coolness of cutting by incorporating in the wheel a material which will control the friability of the cutting surfaces of the wheel. Another object of this invention is to increase the safety of a grinding wheel by lowering its weight so that centrifugal forces tending to rupture the revolving wheel are materially less.

In the manufacture of vitrified ceramic bonded abrasive articles, high porosity is obtained by incorporating combustible particles such as coke, sawdust, nut shells, etc. into the composition. When such compositions are fired at high temperatures the organic particles are burned out, leaving voids throughout the article. Because ceramic bonded abrasives can be made porous and cool cutting in this way, they have had an advantage over organic bonded abrasives for certain grinding operations.

Recently organic bonded articles have been made porous by incorporating particles such as naphthalene or paradichlorobenzene into the composition so that the naphthalene or paradichlorobenzene will volatile during the lower temperature baking cycles used to vulcanize or thermoset the resinous binders. Many disadvantages are inherent in the use of this type of pore former. For example, naphthalene and paradichlorobenzene can be sized to the desired particle size with some difficulty but on short storage they tend to cake or coalesce so they have to be rescreened before use. Naphthalene and paradichlorobenzene are very low melting so that at the initial stages of the baking cycle when the binder is fusible these fluid pore formers also melt and increase the fluidity of the binder with the result that the article will slump and have bond flow giving an article which is difficult to control as to uniformity and porosity. Further in some sizes of wheels all of the naphthalene or paradichlorobenzene is not completely removed during the baking cycle, resulting in a wheel which gives off a strong odor in use.

I have discovered an alternative method of procedure whereby I obtain the advantages of a highly porous structure in low temperature organic bonded abrasives without such difficulty in manufacture. I do this by incorporating in an otherwise normal type abrasive mix particles of a highly porous character comprising open pores enclosed by thin supporting walls. These particles, which I designate as pore-support members, separate the harder, tougher particles of usual abrasive such as fused alumina or silicon carbide from one another and still support these particles and the bond therefor so that they are firmly retained in position during the curing of the bond and thereafter until in use the pore-support members are individually broken away by contact with the work being abraded, leaving behind an open space between the abrasive particles as described below.

These pore-support bodies are within themselves highly porous. They may be either thin walled balloons or sponge-like bodies, but are non-thermoplastic. They are sufficiently weak to deform locally when the abrasive mix is pressed or otherwise molded and thus permit close packing but do not crush or yield to a stage where they cease to support the surrounding abrasive particles and the bond. In the case of those bodies in which the pores open to the outside of the particles, their porosity moreover permits absorption of a certain amount of a softened resin binder within the pore-support member and so prevents running and slumping of the bond during curing and results in a strong uniform wheel structure.

Among the substances which I have found excellent for use as pore-support members are individual small thin walled balloons of vitrified clay material described in U. S. Patent 2,676,892, dated April 27, 1954, and marketed under the name of Kanamite. I have also used other small hollow rigid spheres of heat hardened resin. The latter are sold by makers of phenolic resins under the name "Microballoon foam" to oil refiners for floating on the oil in storage tanks to reduce evaporation losses.

In addition to these minute balloon-like particles which contain over 90% of pores by volume, there are numerous rigid brittle sponge-like materials containing 50% or more by volume pore space within themselves which I may use as pore-support members, for example, expanded plastics such as those discussed beginning at page 800 in the 1950 Modern Plastics Encyclopedia and Engineers Handbook or the thermal insulating material of porous glass, such for example as is sold under the trade name of "Foamglas." These may be cut or otherwise preformed to desired shapes as discussed below or may be crushed, sifted and used in granular form. Other natural or artificial rigid sponge-like masses such as pumice or expanded sodium silicate may be used. The internal porosity of such materials runs from as low as 40 to as high as 75%. I prefer material with at least 50% internal porosity.

One material for the supporting particles which I have found very useful is heat expanded perlite. Perlite and its thermal expansion product is described in the U. S. Bureau of Mines Information Circular #7364 by O. C. Ralston, August 1946. Perlite is a siliceous, volcanic glass containing between 2% and 5% of chemically combined or dissolved water. Perlite may be broadly defined as any siliceous lava containing sufficient volatile material either combined or dissolved to cause it to expand into bubbles when the material is quickly heated to a suitable point in the softening range. The term "perlite" will hereinafter be used to identify the commercially expanded or intumesced material made in this way.

My invention may be applied using either the balloon-like particles or granules of any of the brittle rigid sponge-like materials in any type of abrasive body in which the abrasive granules are of fused alumina, silicon carbide or other dense hard abrasive and in which the bond is organic or otherwise of such a low temperature nature that it is impractical to burn out oxidizable pore formers. The binders may, for example, be organic such as phenolic or alkyd resins, shellac or dispersible rubber or synthetic elastomers, magnesium oxychloride or low temperature ceramic binders such as sodium silicate or bonds of the type disclosed in U. S. Patent No. 2,316,161 although the non-thermoplastic organic sponge-like materials should be avoided when curing temperatures above 500° F. are to be employed.

In certain forms of my invention, I build into the structure of an abrasive article pre-formed inserts of more continuous rigid brittle highly porous sponge material, containing no abrasive in the usual sense, and intersperse these with abrasive portions of the more conventional types, which may obviously also themselves be made using abrasive modified with included brittle granules as described herein.

Figure 2:
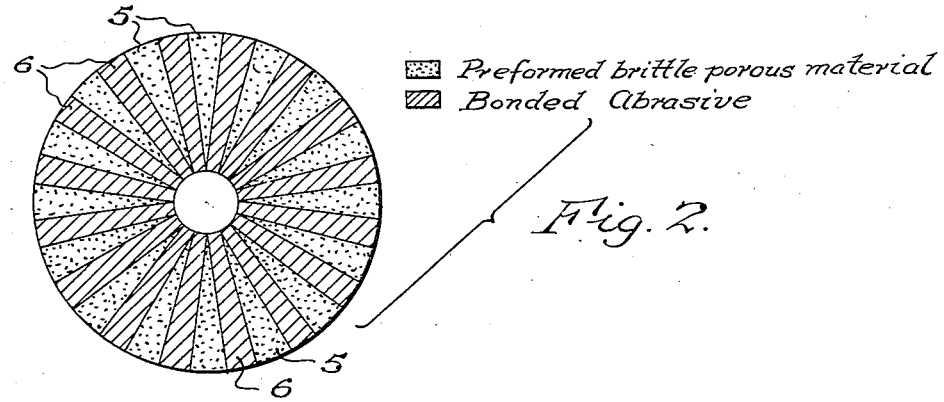
Figure 3:
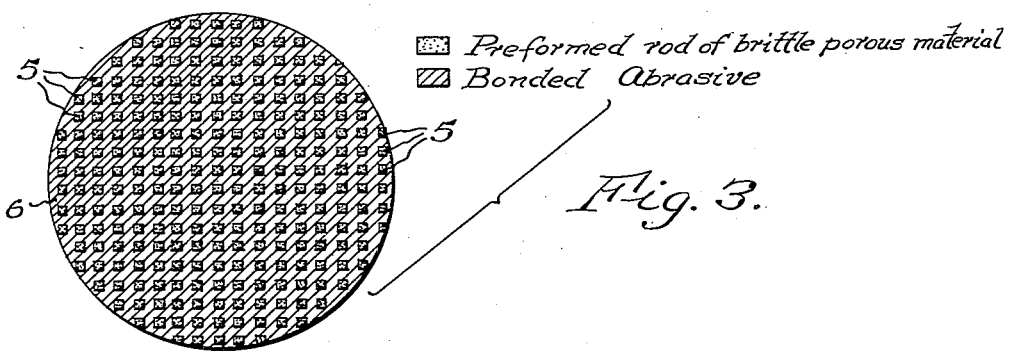

In the accompanying drawings which illustrate specific aspects of my invention:

Figure 1 shows a magnified cross section of a fragment broken from a grinding wheel in which granules of pore-supporting material are included; Figure 2 shows a side grinding face of an abrasive disc containing shaped inserts of brittle, rigid sponge like material; Figure 3 shows a side grinding face of another abrasive disc containing inserted rods of brittle, rigid foamed material, and Figure 4 shows a section similar to Figure 1 but in which the pore-support members are microballoons.

Figure 4:
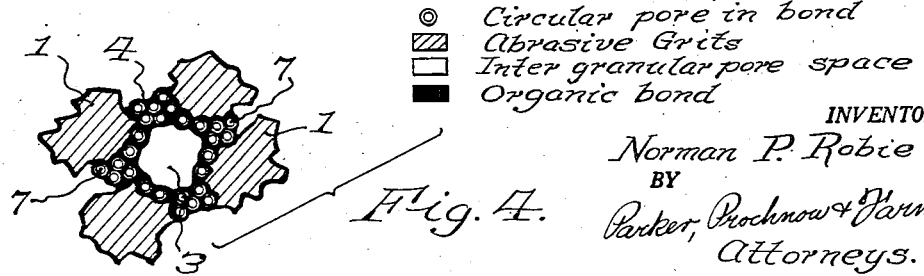

In the drawing of Figures 1 and 4, 1 indicates a particle of abrasive grain which may be of fused alumina, silicon carbide or other desired abrasive material, 2 indicates a rough granule of brittle, rigid porous material, 3 an open pore of the type normally occurring between the particles of grinding wheels, and 4 is a film of cured phenolic resin or other organic bond. 7 in Figure 4 indicates a microballoon pore-support.

It will be noted that the pore-support members do not enclose within their walls all the pore space found in the abrasive body. Rather, the pores between such particles and the abrasive granules present may constitute from 5 to 40% of the volume of the entire body. I prefer to add pore-support members in such quantity that their own overall volume is from 10 to 25% of the volume of the final abrasive. Expressed in terms of weight, this means they constitute from $\frac{1}{10}$ to 3% of the weight of the entire body depending upon relative densities of the various materials involved and the degree of friability which it is desired that the wheel for instance should have.

When a material volume of a porous ingredient is added in this way, the result is that at the face of the grinding wheel in direct contact with the work being ground the pore-support breaks away and flies out, leaving behind an additional pore, so that at the immediate working face of the wheel the porosity may run to 60% or higher. Yet the strength of the wheel is such that it can be operated in safety comparable to that with heavier regular wheels of only half that porosity. The increased effective porosity of the working face results in a cool cutting wheel which does not load or bind and which cuts with excellent efficiency. The edges of the abrasive grains are left openly exposed in such a way as to utilize their cutting ability to the utmost, while a supply of cooling air or cutting fluid is entrained in the open pores and wiped against the face of the work being ground giving a highly effective cooling action.

Also my structure is more uniform than the old type when porosities of the two are equal because as explained above the bond in my type remains in place and clings to the grains instead of running to the lower face of the wheel during curing. In wheels of this type the proportion of bond (which is what imparts strength to a wheel) can be as much as double that in an ordinary abrasive wheel without causing the wheel to burn the work being ground.

In ordinary abrasives of fused aluminum oxide the density for instance runs from perhaps 0.105 down to 0.080 lb. per cubic inch, and in silicon carbide wheels from 0.086 to 0.065 lb. per cubic inch. Below those densities the wheels tend to be undesirably hazardous for operation.

Yet with my aluminum oxide wheels containing 1½% by weight of perlite for example, the density can be as low as 0.077 lb. per cubic inch with safety in a wheel which is strong and efficient cutting.

I prefer in making wheels with any pore support members to use compositions in the following range, which I express in terms of volume so as to include abrasive grains and pore-supports of differing specific gravities:

| | Percent by volume |
|---|---|
| Abrasive particles | 25 to 54 |
| Organic bond | 15 to 45 |
| Pore-support granules | 5 to 30 |

Counted as part of the bond, I may include the fillers normally used in such wheels such as powdered cryolite, etc., which are added along with the resin in amounts up to 50% of the weight of the resin.

Example 1

To make an abrasive wheel of the type shown in Fig. 1, I give the following illustrative example in which compositions are given in parts by weight:

| | |
|---|---|
| 24 grit alumina abrasive | 83.00 |
| Powdered heat hardenable phenolic resin | 8.64 |
| Cryolite | 6.00 |
| Liquid heat hardenable phenolic resin | 2.36 |
| Intumesced perlite 14–24 mesh | 2.18 |

The abrasive was wet with the liquid resin and the perlite then added and mixed to get it wet by contact. Then a mixture of the powdered resin and cryolite was added and mixed in, after which the mix was placed in a mold, levelled off and pressed as usual in the formation of grinding wheels to a density of 0.0777 lb. per cubic inch. The formed wheel was then removed from the mold and cured in the usual way, holding it at 185° F. for 15 hours and then raising the temperature gradually to 365° F. at which temperature it was held another 12 hours. After curing, the density of the wheel had risen to 0.0781 lb. per cubic inch and the wheel was strong and sound.

Wheels, 14 x 2 x 1½ inches, made in this way were used to grind plow shares in competition with porous resin wheels of the paradichlorobenzene type which the customer normally used and considered satisfactory. A representative wheel of the latter type produced 8400 pieces, whereas my wheel with pore supports produced between 20,000 and 21,000 pieces at the same production rate as the paradichlorobenzene wheel and with noticeable coolness and freedom of cut.

Example 2

To make an abrasive wheel of the type indicated in Fig. 4, I proceed as follows, ingredients being given in parts by weight:

91.8% 60 grit silicon carbide
8.0% powdered uncured phenolic resin
0.2% resin microballoons
55 cc. furfural per pound of resin
10 cc. neutral creosote oil per pound of resin The dry powdered resin and microballoons are first premixed with one another and this mixture then added to the abrasive grain which has been wet up with the furfural. Finally the creosote oil is added to the mixture which is then ready to form into wheels. Such wheels should be pressed and cured to a density of .0579 lb. per cubic inch.

In the examples given for illustration, the particle size of the resin microballoons in Example 2 is of the order of .0002 to 0.0036 inch in diameter, obviously far smaller than that of the abrasive particles. In this case the microballoons make the bond film porous. The particle size of Kanamite bubbles (from about 30 to 60 mesh or from 0.025 to 0.010 inch diameter) approaches the abrasive grain size in many wheels. In Example 1 on the other hand, the perlite particles were 14 to 24 mesh while the abrasive grains were 24 mesh. I find that in general the diameter of the perlite and similar particles should be from one to two times the diameter of the largest abrasive particles in the mix although at times they may be smaller, down to about ¼ the diameter of the abrasive granules. In unusual cases they may be materially larger, up to about four times the abrasive granule diameter. In the latter cases, it is usually better however to make an abrasive body of the type illustrated in Figure 2 or 3 rather than by random inclusion of larger perlite grains which is apt to result in poor balance within the wheel.

All of my pore-support materials are obviously so porous as to be very low in density. Perlite for example runs from 0.2 to 0.4 gram per cc. when in closely graded particle sizes, Kanamite is around 0.5 gram per cc. and resin microballoons 0.13 gram per cc. Comparable figures would be 2.3 grams per cc. for fused aluminum oxide abrasive and 1.85 grams per cc. for silicon carbide abrasives. Hence the amount of pore-support material required in abrasive wheel formulation is very low when expressed in terms of weight, running from as low as 1/10 of 1% by weight with microballoons to as much as 5% of a material like perlite in extreme cases. It is usually easier to assemble abrasive mixes by weight although it is common to express the finished mixture in terms of volume relationships between abrasive and bond. In Example 1 above, the approximately 2% by weight would occupy about 15% of the entire volume of the abrasive wheel beyond which unfilled pores would occupy another 15 to 20% of the volume. In the course of ordinary grinding operations, I find the use of between 1/10 and 3% by weight of pore-support material to be satisfactory. This would represent from 1 to 30% if expressed on a volume basis.

In the manufacture of abrasives using pore-support material with open pores, the pore-support is lightly penetrated by the resin bond. The degree of bond penetration may be increased by preliminary impregnation of the particles before their addition to the mix or by controlling the wetness of the mix and the time of mixing. On the other hand, the bond penetration may be lessened or minimized by suitable means or additional ingredients may be introduced into the wheel within the pores of the pore support particles. These variations produce important changes in the structure and performance of the grinding wheel. In this connection among possible alternatives, I may partially fill the pore support members with resin bond which will reduce resin flow by containing part of the bond or I may take precautions to prevent resin penetration by the method of mixing, by sealing the surface with repellant materials such as graphite, talc, powdered metallic stearates, oils, silicone oils and greases, etc. I may also use these porous pore supports to contain cutting lubricants or modifiers to prevent loading such as waxes, greases, oils, resins, chlorinated compounds and combinations thereof. Mineral fillers of the type common to ordinary abrasive wheels may also be included to modify the organic bond in mixes using my pore supports.

By close microscopic examination of the structure of the wheels made in accordance with my invention, I find that at times the particles of abrasive grain form a series of cellular clusters with particles of perlite as nuclei. This concentrates the strength-giving portion of the body in the walls of the clusters and yields a body which is unusually strong in relation to its effective porosity. This effect can be increased by first coating the pore support particles with a tacky adhesive, then mixing in the abrasive granules and then the remaining ingredients, taking care to avoid too violent tearing action during the mixing procedure.

As a further alternative, I may make abrasive bodies by the means illustrated in Figures 2 and 3 in order to secure soft fast cutting wheels, discs or rubs. In these two views, the rigid sponge-like material 5 is shown in the shape of pre-formed inserts for making which I use one of the rigid sponge-like materials which is available in block or thick sheet form such as expanded plastic or the frothed or porous glass sometimes called Foamglas. Pieces of the desired shape are cut from this material and may then be located with respect to the wheel to be made by inserting them in cavities in the lower face of a mold which is then filled in with abrasive mix 6 of the desired type, pressed and the wheel completed in the usual manner.

An alternative method of procedure which is useful in handling large broad preforms such as those illustrated as 5 in Figure 2 is to stick these preforms in place with suitable adhesive on a cloth or paper backing which is then laid in the mold with the preforms up and abrasive mix packed around and over the preforms prior to pressing. This is recommended especially in making side grinding discs such as shown in Fig. 2, where the sponge-like material is exposed at only one face of the body. After the body has been cured, the face of cloth or paper should be torn away or otherwise removed. Structures of this type are particularly useful in grinding articles where a large area is in contact with the abrasive face and where it is important that ample chip clearance be provided. The chips temporarily embed themselves in the preform and hence do not scratch the face of the work being ground. Coolants, etc. may also be incorporated in the preformed inserts if desired and thereafter exert an effect throughout the life of the wheel.

I have described my invention in general terms with sufficient detail to permit an understanding of the underlying principles involved. The example given is included by way of illustration and not for limitation.

I claim:
1. An abrasive article consisting essentially of abrasive granules, a phenolic resin bond therefor and individual minute thin walled hollow spheres less than 0.025 inch in diameter distributed throughout the resin bond and between the abrasive granules, said minute walled hollow spheres constituting from 1 to 30% of the volume of the article.

2. An abrasive article in accordance with claim 1 in which the thin walled hollow spheres are made of phenol-formaldehyde resin.

3. An abrasive article in accordance with claim 1 in which the thin walled hollow spheres are made of vitrified clay material.

4. An abrasive article in accordance with claim 1, the pores within said article being impregnated with a lubricant.

References Cited in the file of this patent
UNITED STATES PATENTS

| | | |
|---|---|---|
| 1,986,849 | Pohl et al. | Jan. 8, 1935 |
| 2,104,609 | Leeuw | Jan. 4, 1938 |
| 2,113,185 | Thilenius | Apr. 5, 1938 |
| 2,487,207 | Adams | Nov. 8, 1949 |
| 2,734,812 | Robie | Feb. 14, 1956 |

FOREIGN PATENTS

| | | |
|---|---|---|
| 44,410 | France | Jan. 19, 1935 |
| 1,040,618 | France | Oct. 16, 1953 |